(12) United States Patent
Mitchell et al.

(10) Patent No.: US 11,691,433 B2
(45) Date of Patent: Jul. 4, 2023

(54) METHOD AND DEVICE FOR PRODUCING A PRINTED MICROARRAY AND VERIFYING THE SAME

(71) Applicant: Arrayjet Limited, Lothian (GB)

(72) Inventors: Benjamin Mitchell, Northumberland (GB); Joan Salvatella Serra, Edinburgh (GB); Marisa Chong-Kwan, Edinburgh (GB)

(73) Assignee: Arrayjet Limited, Dalkeith (GB)

( * ) Notice: Subject to any disclaimer, the term of this patent is extended or adjusted under 35 U.S.C. 154(b) by 479 days.

(21) Appl. No.: 16/640,029

(22) PCT Filed: Sep. 5, 2018

(86) PCT No.: PCT/GB2018/052506
§ 371 (c)(1),
(2) Date: Feb. 18, 2020

(87) PCT Pub. No.: WO2019/048845
PCT Pub. Date: Mar. 14, 2019

(65) Prior Publication Data
US 2020/0254781 A1 Aug. 13, 2020

(30) Foreign Application Priority Data
Sep. 5, 2017 (GB) .................... 1714263

(51) Int. Cl.
*B41J 2/21* (2006.01)
*B01J 19/00* (2006.01)
(Continued)

(52) U.S. Cl.
CPC ......... *B41J 2/2142* (2013.01); *B01J 19/0046* (2013.01); *B01L 3/502715* (2013.01);
(Continued)

(58) Field of Classification Search
CPC ............. B01L 3/502715; B41J 2/2142; G01N 21/8806; G01N 21/956; B01J 19/0046;
(Continued)

(56) References Cited

U.S. PATENT DOCUMENTS 6,187,537 B1 * 2/2001 Zinn, Jr. ............... B01L 3/0258
435/6.12
6,232,072 B1 5/2001 Fisher
(Continued)

FOREIGN PATENT DOCUMENTS

| CN | 1404415 | 3/2003 |
|----|---------|--------|
| CN | 1573330 | 2/2005 |

(Continued)

OTHER PUBLICATIONS

UK Search Reporton GB 1714263.9 dated Feb. 21, 2018; 4 pages.
(Continued)

*Primary Examiner* — Sang H Nguyen
(74) *Attorney, Agent, or Firm* — Foley & Lardner LLP

(57) ABSTRACT

Method for manufacturing a microarray and verifying the quality of said microarray, wherein the method comprises: —providing at least one reagent, —loading said at least one reagent in a dispensing print head, in a predetermined arrangement, —moving the print head with respect to a substrate and dispensing said at least one reagent on the substrate, during a print pass, to obtain a microarray, —illuminating the substrate using illumination means and obtaining an image of the printed microarray on the substrate, using a camera, —processing the obtained image to verify the quality of the microarray, wherein the step of obtaining an image of the printed microarray comprises: —illuminating the substrate and obtaining an image of the microarray by means of illumination means and a camera which are connected to and move together with the print (Continued)

head with respect to the substrate, the illumination means and the camera being adapted to move behind the print head.

9 Claims, 5 Drawing Sheets

(51) Int. Cl.
    *G01N 21/88*     (2006.01)
    *G06T 7/00*     (2017.01)
    *G01N 21/956*     (2006.01)
    *B01L 3/00*     (2006.01)

(52) U.S. Cl.
    CPC ....... *G01N 21/8806* (2013.01); *G01N 21/956* (2013.01); *G06T 7/0002* (2013.01); *B01J 2219/00378* (2013.01); *B01J 2219/00693* (2013.01)

(58) Field of Classification Search
    CPC ... B01J 2219/00378; B01J 2219/00693; G06T 7/0002
    See application file for complete search history.

(56) References Cited

U.S. PATENT DOCUMENTS

| | | | | |
|---|---|---|---|---|
| 6,689,319 | B1* | 2/2004 | Fisher | B41J 29/393 |
| | | | | 422/500 |
| 6,936,474 | B2* | 8/2005 | Chiou | B01J 19/0046 |
| | | | | 506/40 |
| 7,371,347 | B2* | 5/2008 | Wulf | G01N 35/1011 |
| | | | | 422/65 |
| 8,726,944 | B2* | 5/2014 | Carlsson | B01L 3/0234 |
| | | | | 422/65 |
| 2002/0101469 | A1 | 8/2002 | Wade et al. | |
| 2003/0113233 | A1* | 6/2003 | Nanthakumar | G01N 35/1074 |
| | | | | 422/400 |
| 2003/0232123 | A1 | 12/2003 | Bass et al. | |
| 2004/0023223 | A1* | 2/2004 | Thompson | B01J 19/0046 |
| | | | | 506/40 |
| 2004/0082059 | A1 | 4/2004 | Webb et al. | |
| 2004/0197817 | A1 | 10/2004 | Caren et al. | |
| 2007/0161119 | A1* | 7/2007 | Peck | B01J 19/0046 |
| | | | | 436/180 |
| 2008/0006653 | A1* | 1/2008 | Dai | G01N 35/1074 |
| | | | | 222/75 |
| 2010/0137157 | A1* | 6/2010 | Shaw | G01N 33/54313 |
| | | | | 506/13 |
| 2018/0264464 | A1* | 9/2018 | Greef | B01L 3/5023 |

FOREIGN PATENT DOCUMENTS

| | | |
|---|---|---|
| CN | 1598872 | 3/2005 |
| CN | 101316652 | 12/2008 |
| CN | 103217324 | 7/2013 |
| JP | 2012-504412 A | 2/2012 |
| WO | WO-2004/099937 | 11/2004 |
| WO | WO-2007/063459 A1 | 6/2007 |

OTHER PUBLICATIONS

Chinese Examination Report on CN appln 2021053101171100 dated Jun. 3, 2021.
International Search Report and Written Opinion of the International Searching Authority on PCT/GB2018/052506 dated Oct. 25, 2018 (12 pages).
William Fisher et al, "An automated biological fluid dispensing system for microarray fabrication using inkjet technology", 2006 IEEE International Conference on Robotics and Automation (ICRA): Orlando, FL, May 15-19, 2006, IEEE Operations Center, Piscataway, NJ,May 15, 2006 (May 15, 2006), p. 1786-1793.
Japanese Office Action on JP Appln. 2020-511379 dated Aug. 30, 2022 (9 pages, including English translation).

* cited by examiner

METHOD AND DEVICE FOR PRODUCING A PRINTED MICROARRAY AND VERIFYING THE SAME

CROSS REFERENCE TO RELATED APPLICATIONS

The present application is a U.S. National Stage Application under 35 U.S.C. § 371 of International Patent Application No. PCT/GB2018/052506, filed on Sep. 5, 2018, which claims the benefit of priority to United Kingdom Patent Application No. 1714263.9, filed on Sep. 5, 2017, the disclosure of each of which is incorporated by reference herein in its entirety.

FIELD OF THE INVENTION

The invention relates generally to methods of producing printed microarrays in which spots of a biomolecule are located on a substrate using a dispensing print head, In particular, there is described a method and a device for producing a printing microarray and inspecting the printed microarray to determine the microarray is correctly printed.

BACKGROUND OF THE INVENTION

Microarrays (also known as biochips) are important in the study of biomolecules such as genomic DNA, cDNA, oligonucleotide sequences, proteins, antibodies and the like. Suitably biomolecules are provided to a substrate in an ordered array and then analytes can be provided to the substrate to determine binding to the biomolecules of the substrate. This can be useful in analysis of biomolecular interactions or reactions, for example to profile gene expression, discovery of therapeutic molecules, or to measure protein binding. Printing of the biomolecules onto a substrate allows such analysis to be undertaken on large number of samples.

Microarrays are printed by means of an array printer, such as an inkjet array printer, on a solid substrate. The array printer prints a reagent comprising biological material on an adapted surface, such as a Nitrocellulose coated slide. A significant problem in printing of biomolecules is print variation of the spot sample of the biomolecules onto the substrate. For example the size, shape or location of the spot sample can be incorrectly provided on the array, or indeed the spot may not be printed at all.

United States patent application publication US 2004/0259261 discloses a method for manufacturing a microarray and verifying the quality of the produced microarray at the same time. To allow the step of verification of the quality, the method according to US 2004/0259261 comprises a step of taking images of the obtained microarray. The image is taken by means of a laser-exited fluorescent scanning photometer. In order to allow this step, the reagent used to produce the microarray is labelled with a fluorescent marker.

In practise, microarrays are manufactured by means of a dispensing print head which is adapted to load a plurality of reagents. The print head comprises an adapted dispenser, provided with dispensing means, such as nozzles, to dispense the reagents during the microarray production.

The task of printing reagent on a substrate to provide microarrays requires the transfer of extremely small amounts of many different reagents from separate reservoirs or wells in the print head to closely spaced positions on the substrate. The printing of reagents can be undertaken, for instance, by projecting the liquid through the air onto the substrate without contact using a print head provided with nozzles, such as an inkjet print head. Alternatively, another type of print head could be used, such as a bubble jet.

Typically the main difficulty with such inkjet technology is that air in a nozzle can cause it to print misplaced spots or fail to print a spot(s). Several factors can cause printing errors, for example blockage or failure of a nozzle, sample precipitation, unsuitable sample viscosity or empty sample wells.

The aim of the present invention is to further improve the production process of microarrays and to allow immediate verifying of the printed microarray after the step of printing.

A further aim of the invention is to allow the microarrays to be quantified corrective action taken, where applicable, during a print run without the need of using any additives to improve the step of verifying the quality of the microarrays and of waiting until the print run has ended for the slides to be removed and scanned.

SUMMARY OF THE INVENTION

According to a first aspect of the present invention there is provided a method for manufacturing a microarray and verifying the quality of said microarray, wherein the method comprises:
  providing at least one reagent,
  loading said at least one reagent in a dispensing print head, in a predetermined arrangement,
  moving the print head with respect to a substrate and dispensing said at least one reagent on the substrate, during a print pass, to obtain a microarray,
  illuminating the substrate using illumination means and obtaining an image of the printed microarray on the substrate, using a camera,
  processing the obtained image to verify the quality of the microarray, wherein the step of obtaining an image of the printed microarray comprises:
  illuminating the substrate and obtaining an image of the microarray by means of illumination means and a camera which are connected to and move together with the print head with respect to the substrate, the illumination means and the camera being adapted to move behind the print head, wherein the method further comprises determining for the substrate and the reagent an optimal time interval between the step of printing of the microarray and the step of illuminating the substrate and obtaining an image of the microarray, to thereby optimise the contrast of the image obtained,
  determining the distance between the print head and the camera, and
  moving the assembly of the print head, illumination means and the camera with respect to the substrate at a determined speed adapted to allow obtaining the image of the microarray after said optimal time interval.

The advantage of having illumination means in a camera which are connected to and moving together with the print head, is that the quality of a printed microarray can immediately after printing be verified. When moving the print head with respect to the substrate, freshly printed microarrays can be illuminated by using the illumination means and the camera can be used to obtain an image of the obtained microarrays, within short time after the printing of the microarray being completed.

Suitably, the method further comprises providing the substrate with a reflective surface, such as a mirror, positioned, seen from the camera's perspective, behind the substrate, and using the reflective surface to reflect light towards to camera to thereby improve the contrast of the image obtained.

Suitably, the illumination means are positioned perpendicular with respect to the substrate Suitably the illumination means are adapted for providing pulsed illumination of the substrate.

Suitably, the step of dispensing said at least one reagent on the substrate, comprises:
dispensing said at least one reagent on a Nitrocellulose film.

According to a second aspect of the invention, there is provided a device for manufacturing a microarray and verifying the quality of said microarray, the device comprising:
a print head adapted to load at least one reagent, the print head being adapted to move with respect to a substrate and to dispense said at least one reagent on the substrate, during a print pass, to obtain a microarray,
illumination means for illuminating the substrate,
a camera for obtaining an image of the printed microarray on the substrate,
processing means connected to said camera for processing the obtained image to verify the quality of the microarray,
wherein the illumination means and the camera are connected to the print head and are adapted to move with respect to the substrate together with the print head, the illumination means and the camera being positioned to move behind the print head, wherein the device further comprises control means adapted to control the movement of the assembly of the print head, illumination means and the camera with respect to the substrate, the control means being adapted to receive information relating an optimal time interval between the step of printing of the microarray and the step of illuminating the substrate and the control means being adapted to move the assembly of the print head, illumination means and the camera with respect to the substrate at a determined speed adapted to allow obtaining the image of the microarray after said optimal time interval.

Suitably, the device further comprises a reflective surface, such as a mirror, positioned, seen from the camera's perspective, behind the substrate, adapted to reflect light towards to camera to thereby improve the contrast of the image obtained.

Suitably, the illumination means are positioned to allow illumination in a perpendicular direction with respect to the substrate.

Suitably, the illumination means adapted for providing pulsed illumination of the substrate.

Suitably, the device is adapted to dispensing said at least one reagent on a Nitrocellulose substrate.

BRIEF DESCRIPTION OF THE DRAWINGS

Embodiments of the invention will now be described by way of example only with reference to the drawings, in which.

Figure 1:
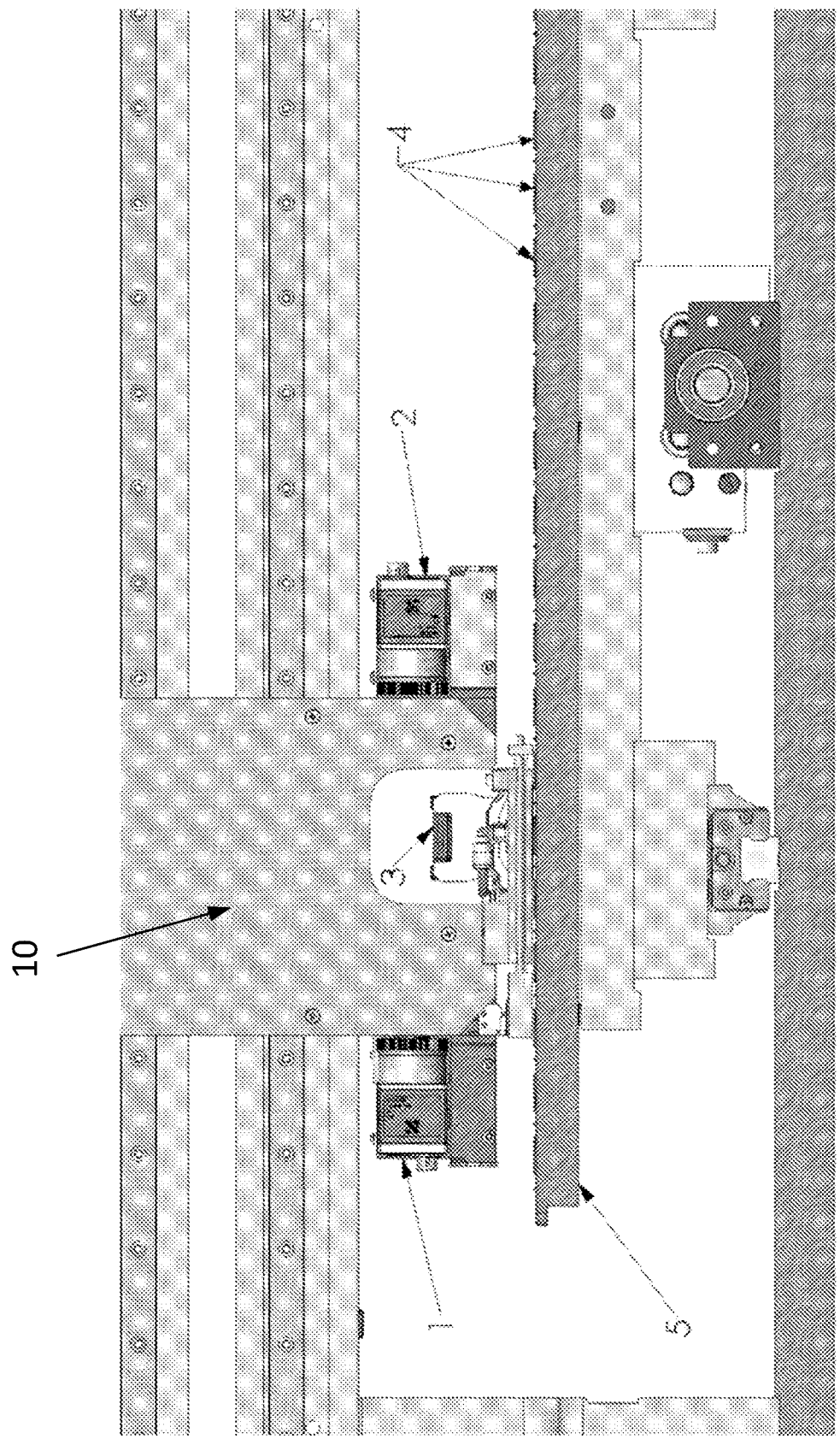
FIG. 1 illustrates a cross sectional view of an apparatus according to the present invention.

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

In the present description, reference is made to a reagent. The word reagent is intended to refer to any biological material which is adapted to be used for obtaining microarrays by means of printing.

In the present description, the word microarrays is used to refer to a substrate provided with a plurality of spots dispensed on top of the substrate wherein the spots are dispensed on the substrate in an orderly manner, each of the spots containing a determined quantity of biological material.

In the present description, reference is made to a print head. The print head is intended to refer to an apparatus adapted to dispense biological material on a substrate, for instance by using a plurality of nozzles.

Referring to FIG. 1, a cross sectional view of a microarray printer or microarrayer 10 is shown. The microarrayer 10 comprises a print head 3 which is adapted to dispense reagent on a substrate. The print head 3 is typically adapted to load a plurality of reagents, wherein each of the wells for containing said reagents is connected to a plurality of nozzles for dispensing the reagents on the substrate. As will be appreciated, the print head 3 can be adapted to print onto any suitable substrate such as nitrocellulose, polyvinylchloride, Nylon membranes or glass.

The print head 3 is mounted in the microarrayer to allow relative movement of the print head 3 with respect to a substrate. According to FIG. 1 the print head 3 is used to print a plurality of slides 4 which are positioned on a tray 5 on which a plurality of slides 4 is positioned. As seen in FIG. 1, the print head 3 is typically adapted to move from right to left over the tray 5 in a first print pass and then to move backwards from left to right in a subsequent printpass wherein the first and each subsequent printpass are essentially parallel.

The microarrayer 10 is provided with a first camera 1 and a second camera 2 which are positioned at opposite sides of the print head 3. The camera 1 is adapted to move behind the print head 3 when the print head 3 is moving in a printpass from left to right as seen in FIG. 1. That means that camera 1 can obtain an image of the substrate or slide 4 during the movement of the assembly of the print head 3 and the first camera 1 and the second camera 2 from left to right as seen in FIG. 1. Once a first printpass is completed, the movement of the assembly of the print head 3 and the first camera 1 and the second camera 2 will be inversed. In a subsequent printpass, the camera 2 will be positioned behind the print head 3 and therefore in a subsequent printpass the camera 2 can be used to obtain images of the substrate 4 after printing of a reagent on the substrate by means of the print head 3.

In order for the microarrayer 10, according to FIG. 1, to function properly, the cameras 1 and 2 are mounted inline with the print head 3, wherein the camera 1 and the camera 2 each have a determined distance with respect to the print head 3. Moreover, the cameras 1 and 2 will be positioned with respect to the substrate 4 to allow proper imaging of the substrate 4 by means of the cameras 1 and 2. According to an embodiment, the cameras 1 and 2 will be perpendicular with respect to the substrate. According to an alternative embodiment, the cameras 1 and 2 are positioned under an angle and a mirror is used to allow proper imaging of the substrate 4. According to an example, the angle can be 45 degrees.

In a specific embodiment of the invention, it is possible to use both the first camera 1 and a second camera 2 to obtain images of the substrate 4 during a single printpass. For instance, when the print head 3 is moving from right to left, as seen in FIG. 1, the first camera 1 can be used to obtain an image of the substrate 4 prior to dispensing reagent on a substrate 4 by means of the print head 3. Subsequently, camera 2 can be used to obtain an image of the substrate 4 after the dispensing of reagents on the substrate 4 by means of the print head 3. That means that the images of both camera 1 and camera 2 can be used to analyse the microarray obtained after the dispensing of reagent on the substrate 4. For instance, if camera 1 has obtained an image of the slide 4 prior to printing a possible defect or misalignment or contamination of the slide can be observed. This information can be used to improve the analysis of the image of the same slide once the microarray has been printed.

In the microarrayer 10, according to FIG. 1, the first and second camera 1, 2 will be connected to processing means (not shown in FIG. 1). These processing means are specifically adapted to perform image processing to retrieve from the images obtained by cameras 1 and 2 information on the quality of the microarrays produced on the substrate. The processing means will be provided with known algorithms to allow image processing. The effect of the image processing will be to calculate parameters, related to the quality of the printed microarrays. The processing means will be connected to control means (not shown in FIG. 1) which are specifically adapted to generate instructions of operating print head 3. This means that once the processing means have processed images obtained by cameras 1 and 2, data can be forwarded to the control means to generate instructions for the print head 3, for instance, to alter the operation of the print head 3 in a subsequent printpass to thereby improve the quality of microarrays to be printed.

According to an embodiment of the invention, the control means will be able to recognise whether possible printing defects observed in microarrays obtained during a printpass are either random errors or non-random errors. In case the errors observed in the microarrays are non-random errors, specific amendment of the print head 3 is possible to improve the quality of microarrays to be printed. For instance, in case the processing means, after analysis of a series of images, have determined that the spots obtained by using a specific nozzle in the print head contain printing errors, the control means can generate an instruction to the print head to no longer use the respective nozzle. In a subsequent printpass, instead of using the defective nozzle, an alternative nozzle can be used to avoid repetition of the printing error.

The microarray 10 will be provided with illumination means to illuminate the surface of the substrate 4 when taking images thereof. The illumination means are typically adapted to illuminate the substrate in a direction perpendicular to the surface of the substrate 4. This means that the illumination means are either positioned perpendicular with respect to the surface of the substrate, or used in combination with means such as a mirror, to direct the light in a perpendicular direction with respect to the surface.

Figure 2:
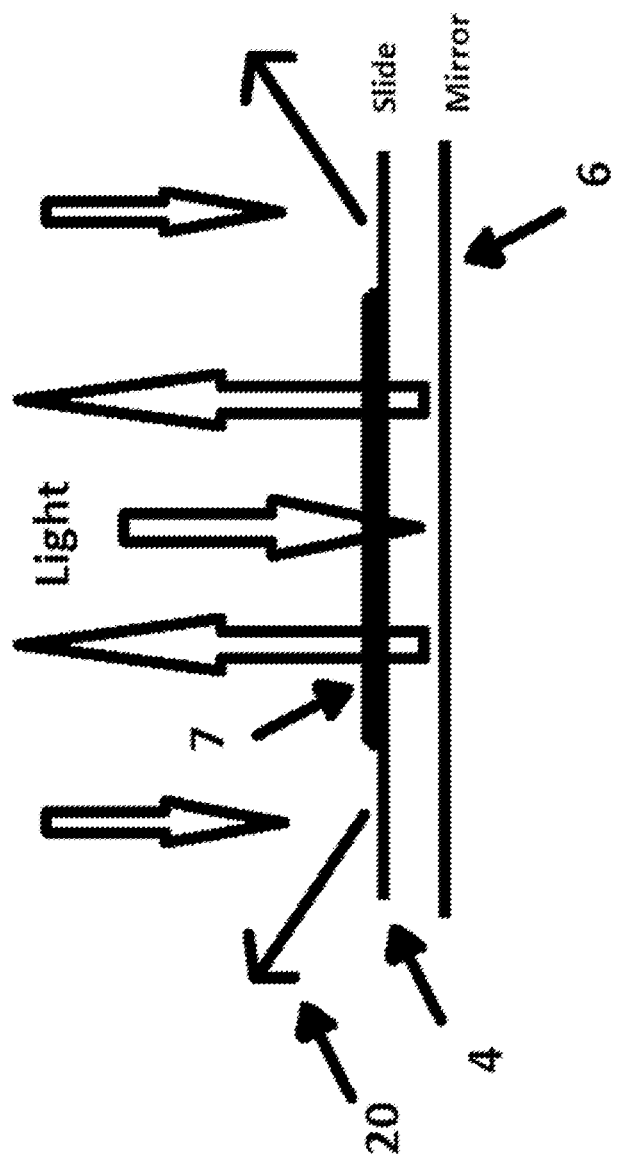
FIG. 2 schematically shows the reflection of light to its camera using a reflective surface beneath the substrate, within an optimal time interval between the printing of a microarray and the illumination of the printed microarray.

In FIG. 2, schematically, the reflection of light by a spot 7 printed on a substrate 4 such as a nitrocellulose substrate is shown. FIG. 2 shows that light directly impacted on the spot 7 is reflected back towards the camera which is positioned adjacent to the illumination means (see FIG. 1). Light that is impacted on the nitrocellulose substrate 4 is either scattered, as schematically indicated by arrow number 20 or is absorbed by the nitrocellulose substrate itself. This means that an image obtained by camera positioned above the spot 7, the printed spot 7 will light up as a white element on a darker background. In order to further improve the contrast of any image obtained of the spot 7 according to the invention, a reflective surface in the form of a mirror 6 is positioned underneath the nitrocellulose substrate 4. The mirror is positioned on the opposite side of the substrate 4, seen from the perspective of the camera which is itself positioned above the substrate 4. The presence of the reflective surface 6 will enhance the reflection of the light impacted on the spot 7. The technical effect of this measure is that the contrast of this image obtained of the spot 7 is improved. This improvement will allow better image processing of the image obtained.

Figure 3:
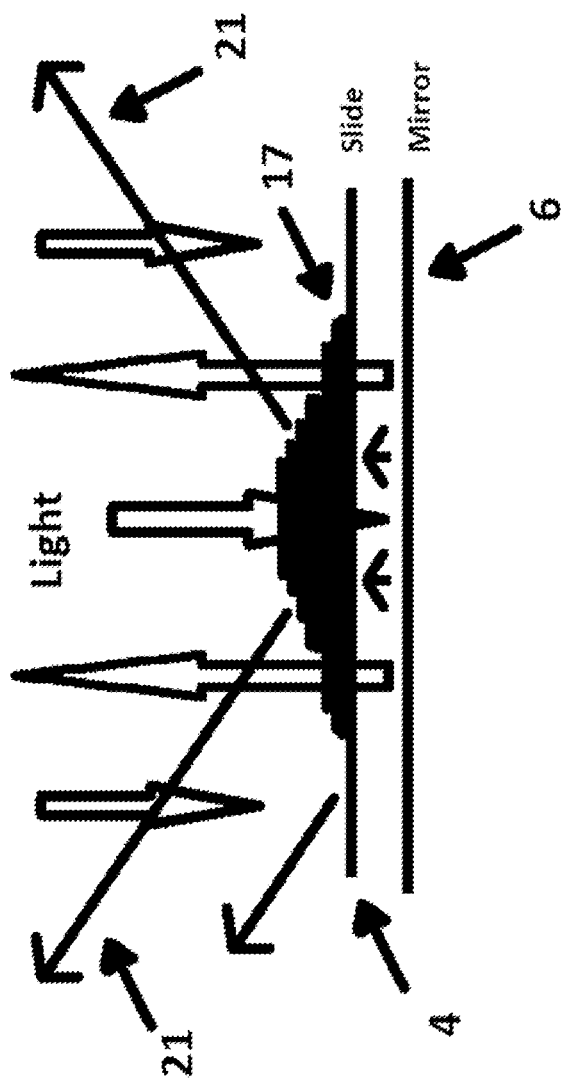
FIG. 3 schematically shows the reflection of light by support of a microarray wherein the spot either comprises a relatively high volume of reagent, or wherein the time interval between printing and illumination of the spot is non-optimal.

By means of an example, in FIG. 3, a spot 17 is shown which is printed on a nitrocellulose substrate 4. The representation according to FIG. 3, can either represent the presence of a spot 17 which comprises a relatively high volume of reagent. Alternatively, the representation of FIG. 3 could represent a spot 17 which has been printed recently and wherein the reagent did not have the time to be absorbed by the substrate 4. In the case of a spot 17 on a substrate 4, as represented in FIG. 3, part of the light impacted on the spot 17 is reflected towards the camera positioned above the substrate 4. This reflection is enhanced by using a mirror 6 positioned underneath the substrate 4. However, part of the light impacted on the spot 17 is scattered as schematically indicated by means of arrows 21. When comparing representation of FIGS. 2 and 3, it is clear that in the case of FIG. 2, a higher amount of light is reflected towards the camera than in FIG. 3. The loss of light, as indicated schematically by arrows 21 being the cause of a lower light impact on the camera after illumination. As can be seen from FIGS. 2 and 3, the amount of reagent used to obtain a spot 7, 17 should be optimised and the time interval between printing a spot 7, 17 on the substrate 4 and taking an image should be optimised to allow some, but not too much absorption of the reagent in the material used for providing the substrate 4. The optimisation of the quantity of reagent used for obtaining a spot 7, 17 and the time interval between the actual printing of the spot 7, 17 and the obtaining of an image of the spot can both be optimised to obtain an image with improved contrast to allow inspection of the shape and form of the individual spot 7, 17 on the substrate 4

Figure 4:
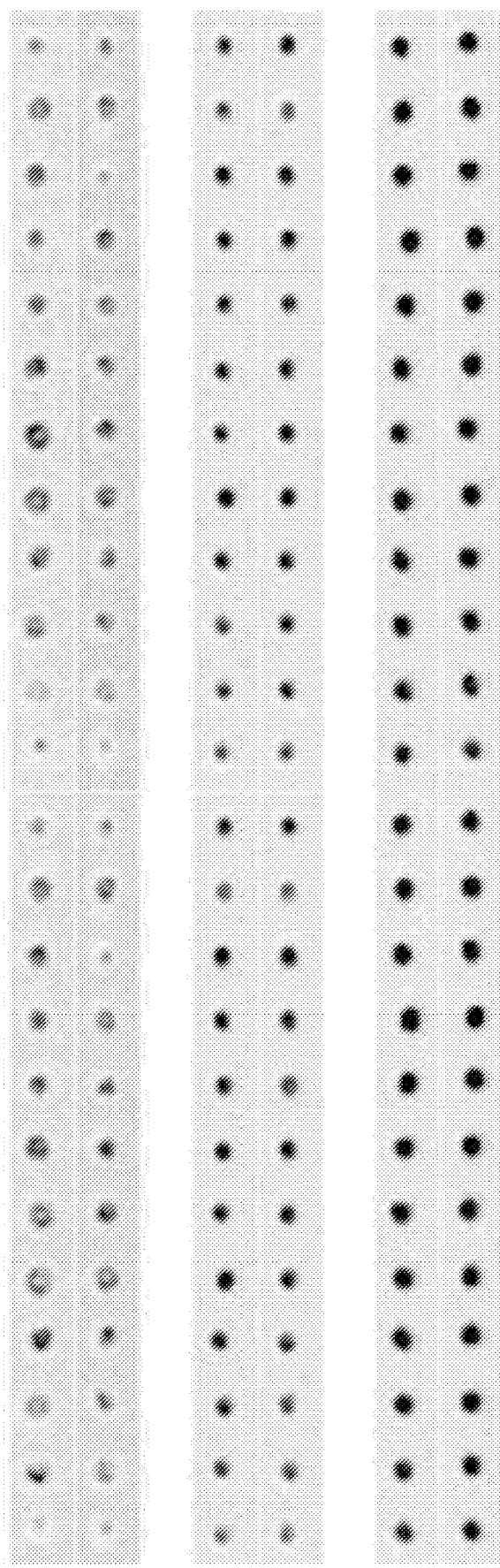
FIG. 4 shows the effect of varying the time from printing to illumination of a spot for obtaining an image of said spot.

In FIG. 4 examples are provided of the difference of the time interval between the actual printing of a spot on a substrate and the obtaining of an image of said spot on the substrate. From top to bottom, the speed of the print head was increased thereby reducing the time interval between the printing of the microarray and the obtaining of an image of the microarray. As can be seen in FIG. 4, the increase of the speed improved the contrast of the individual spots on the substrate visible on the obtained images.

In the example of FIG. 4, the three images relate to one drop/spot (100 pl) printing at three different speeds. The top image is at 0.2 m/s, the middle image is at 0.35 m/s and the final image is at 0.4 m/s. The speed of the print head corresponding to approximate times between printing and image capture of respectively (top to bottom) 300 milliseconds, 180 milliseconds and 155 milliseconds.

Figure 5:
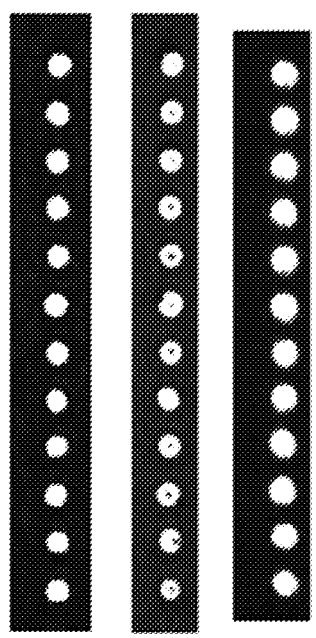
FIG. 5 shows images obtained of microarrays printed on different types of nitrocellulose coatings.

In FIG. 5 a further example of printing a microarray on a nitrocellulose coating and the obtaining of an image of the printed microarrays is shown, wherein the top row, middle row and bottom row are printed on different Nitrocellulose coating types. The top row represents printing onto Avid®, the middle row relates to printing onto Nova® and the final row represents microarray printing on a Supernova® nitrocelllulosic coating In the examples above, reference is made to a specific printing procedure of a microarray on top of a Nitrocellulose coated support. A nitrocellulose coating is used for immobilizing proteins or other biological samples in a solid support. It allows interaction with other molecules in a microarray assay. Therefore a nitrocellulose coating is widely used in the industry and the advantage of the present invention can be obtained by using a plurality of different nitrocellulose coated substrates.

A nitrocellulose coating has the characteristic that the reagent printed on the nitrocellulose coating can, at least partially, be absorbed in the coating. The advantages of the present invention would be available for other support materials which, similar to a nitrocellulose coated support, have the capability of at least partially absorbing reagent on said substrate.

In the example above, reference if made to printing reagent on top of a substrate, in particular, a nitrocellulose substrate. Sample material printed on the nitrocellulose coated substrates typically comprise but are not limited to column proteins (antigens, antibodies) cell lysates, peptides, carbohydrates, DNA etc. The mentioned sample materials are commonly diluted in a printing buffer to obtain the correct concentration of the sample material and required viscosity allowing printing of the sample material by means of a print head.

According to a further aspect of the invention, referring to FIG. 1, the fact that the print head 3 is used in combination with a first and a second camera 1,2 allows for obtaining an image of the substrate prior to reagent being printed on the substrate. The fact that an image of the substrate prior to printing is available further improves the possibility for image processing once an image of a microarray printed on the substrate is available. The image of the unprinted substrate could for instance be used for subtracting the image of the non-printed substrate from the image of the printed substrate prior to further processing of the obtained image of the printed substrate. This could also be used to adjust the gain/gamma/exposure time parameters of the second camera (the one that captures an image after printing) when printing very close to the edges of the nitrocellulose surface, where the reflected light will be higher. This is not so much post processing the image but changes the acquisition parameters to get a better image to start with.

The invention claimed is:

1. A method for manufacturing a microarray and verifying said microarray being manufactured, wherein the method comprises:
   providing at least one reagent;
   loading said at least one reagent in a dispensing print head, in a predetermined arrangement;
   moving the print head at a determined speed with respect to a substrate and dispensing said at least one reagent on the substrate, during a print pass, to obtain a microarray;
   illuminating the substrate using illumination device;
   obtaining an image of the printed microarray on the substrate, using a camera;
   illumination device and the camera are connected to the print head with respect to the substrate and move together with said print head with respect to the substrate and the illumination device and the camera are adapted to move behind the print head;
   processing the obtained image to verify the microarray based on the substrate and the reagent, determining an optimal time interval between the step of printing of the microarray and the step of illuminating the substrate and obtaining an image of the microarray, to thereby optimize the contrast of the image obtained,
   determining a distance between the print head and the camera, and
   based on the determined optimal time interval and the determined distance, modifying the determined speed for moving the assembly of the print head, illumination device and the camera with respect to the substrate at the modified determined speed to allow obtaining the image of the microarray after said optimal time interval.

2. The method according to claim 1, wherein the method further comprises:
   providing the substrate with a reflective surface, including a mirror, positioned, seen from the camera's perspective, behind the substrate, and
   using the reflective surface to reflect light towards the camera to thereby improve the contrast of the image obtained.

3. The method according to claim 1, wherein the illumination device are adapted for providing pulsed illumination of the substrate.

4. The method according to claim 1, wherein the step of dispensing said at least one reagent on the substrate, comprises:
   dispensing said at least one reagent on a Nitrocellulose film.

5. A device for manufacturing a microarray and verifying said microarray, the device comprising:
   a print head adapted to load at least one reagent, the print head being adapted to move at a determined speed with respect to a substrate and to dispense said at least one reagent on the substrate, during a print pass, to obtain a microarray,
   illumination device for illuminating the substrate,
   a camera for obtaining an image of the printed microarray on the substrate,
   processing device connected to said camera for processing the obtained image to verify the microarray,
   wherein the illumination device and the camera are connected to the print head and are adapted to move with respect to the substrate together with the print head, the illumination device and the camera being positioned to move behind the print head, the camera being located at a determined distance from the print head, wherein the device further comprises:
   control device adapted to control the movement of the assembly of the print head, illumination device and the camera with respect to the substrate, the control device being adapted to receive information related to an optimal time interval between the steps of printing the microarray, illuminating the substrate, and obtaining an image, said optimal time interval being based on the substrate and the reagent, the control device being adapted to modify the determined speed to move the assembly of the print head, illumination device and the camera with respect to the substrate at the modified determined speed to allow obtaining the image of the microarray after said optimal time interval.

6. The device according to claim 5, wherein the device further comprises:
   a reflective surface, including a mirror, positioned, seen from the camera's perspective, behind the substrate, adapted to reflect light towards the camera to thereby improve the contrast of the image obtained.

7. The device according to claim 5, wherein the illumination device are positioned perpendicular with respect to the substrate.

8. The device according to claim 5, wherein the illumination device are adapted for providing pulsed illumination of the substrate.

9. The device according to claim 5, wherein the device is adapted to dispensing said at least one reagent on a Nitrocellulose substrate.

* * * * *